INVENTOR.
Thomas J. Powers
BY
Griswold & Burdick
ATTORNEYS

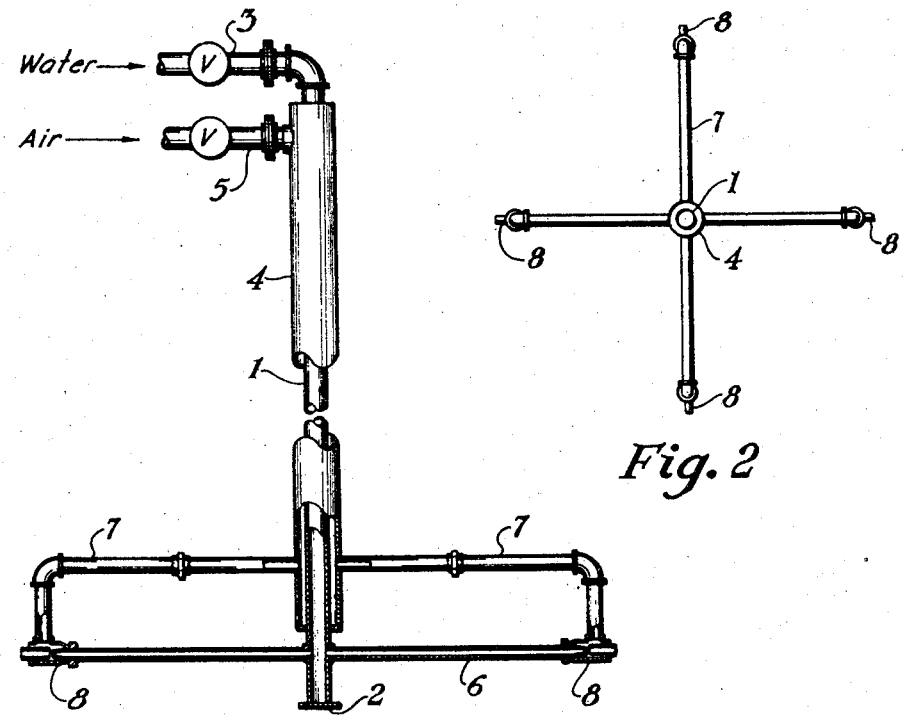
Fig. 1
Fig. 2
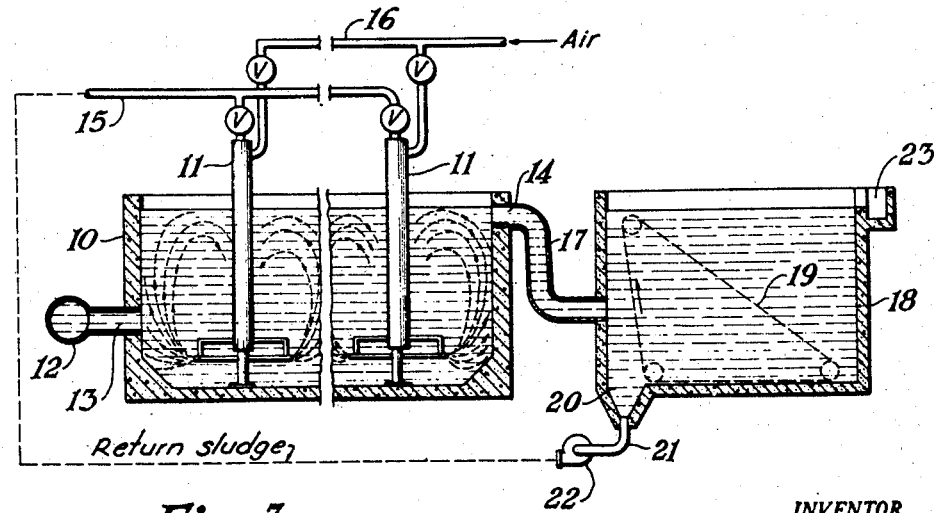
Fig. 3

Patented Aug. 16, 1949

2,479,403

UNITED STATES PATENT OFFICE 2,479,403

METHOD FOR TREATING SEWAGE

Thomas J. Powers, Midland, Mich., assignor to The Dow Chemical Company, Midland, Mich., a corporation of Delaware Application September 28, 1944, Serial No. 556,126

7 Claims. (Cl. 210—8)

The present invention relates to improvements in the treatment of sewage by the activated sludge process. According to the general process the sewage is mixed with active return sludge to inoculate the raw sewage with biological organisms which promote the purification process, and is then subjected to aeration to oxidize and destroy the decomposable organic matter contained in the sewage. The aerated liquid is passed to settling tanks where the sludge is separated, and the purified effluent is discharged to natural drainage channels, while the separated sludge, or part of it, is returned for mixing with incoming sewage.

The two general methods for aeration of the activated sewage, which are commonly practiced, either singly or in combination, are the diffused-air and the mechanical aeration methods. In the former compressed air is forced into tanks containing the sewage through porous plates, called "diffusers," while in the latter the intimate contact of air and sewage is effected by various mechanical devices.

In the diffused-air method the compressed air which is forced into the aeration tanks performs the dual function of purification and of agitation or mixing of the tank contents. As a means of utilizing the oxygen of the introduced air to oxidize the impurities of the sewage the method is highly inefficient. It has been authoritatively estimated that on the average not more than 5 per cent of the oxygen in the air used is utilized in purifying the sewage. The remainder of the air is spent in agitation of the liquid, which is far more than is required for this purpose. The oxidizing effectiveness of the air depends upon the size of the bubbles, and in the diffused-air method it has not been found possible or practical to diffuse the compressed air in sufficiently small bubbles to have good oxidizing capacity. Another drawback is that the porous plates of the diffusers are fragile and subject to clogging, so that they must be removed from time to time for cleaning, and no fully satisfactory cleaning methods have been found.

To overcome the shortcomings and limitations of the diffused-air method numerous mechanical aeration methods have been devised, as well as combinations of diffused-air with mechanical aeration. One purpose of such methods is to reduce or eliminate the consumption of compressed air in the purification process, and thereby reduce the cost of operation. By some mechanical methods it has been found possible to increase the oxygen utilization of the air used for aeration to as high as 30 to 35 per cent. Such mechanical methods, however, require the installation of power-driven equipment, which adds greatly to the cost of the purification plant, and which is subject to wear and tear in use and increases the maintenance cost of the process.

The consumption of compressed air by the various methods is so dependent upon local conditions in every case that comparisons are difficult to make. The quality and strength of the sewage, the preliminary treatment thereof, and the degree of purification desired, are among the variable factors. However, the art shows that for usual sanitary sewage the diffused-air method generally uses about 1 cubic foot of air per gallon of sewage, while some of the mechanical or combination methods may reduce the air consumption to from about 0.2 to 0.6 cubic foot per gallon of sewage. In particular cases the figures vary, depending upon local conditions.

I have found that the aeration of sewage in the activated sludge process can be effected by means which greatly increase the utilization of the oxygen of the air as compared with the diffused-air method, without resorting to the use of mechanical agitators. According to the invention air is introduced into the liquid in the sewage treating tank by means of a water-jet injector submerged below the surface, instead of through a porous plate. In this way the air is injected into the liquid in extremely fine bubbles which are much smaller than the bubbles passing through a porous diffuser plate of the type employed in the practice of the diffused-air method. These very fine bubbles are more effective to oxidize the sewage than the larger bubbles, due to the greater ratio of surface to volume. Thus the same degree of purification of the sewage can be attained with the consumption of a fraction of the volume of air used in the diffused-air method. At the same time sufficient agitation of the liquid is secured without the use of a mechanical agitator in the aeration tank, or any apparatus having moving parts.

The invention, then, consists in the improved method and apparatus hereinafter fully described, the following specification and annexed drawing illustrating some of the ways in which the principle of the invention may be applied.

In said drawing—

Fig. 1 is an elevation, partly in cross-section, of an aerator assembly for use according to the invention.

Fig. 2 is a plan view of an aerator similar to that shown in Fig. 1.

Fig. 3 is a diagrammatic representation of a sewage purification plant embodying the present improvements.

Figure 4:
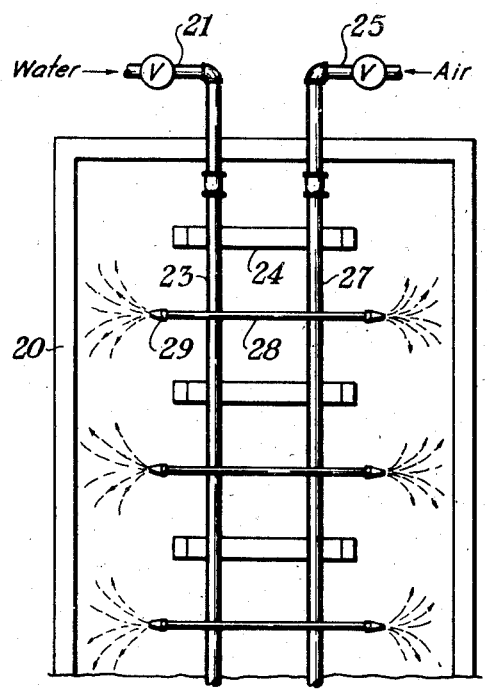
Figure 6:
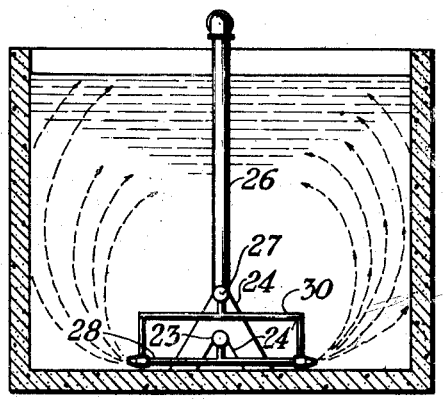
Figure 5:
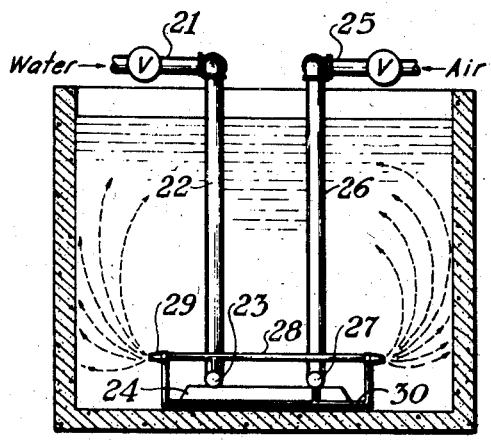

Figs. 4, 5, and 6 illustrate modified forms of apparatus embodying multiple aerating units.

Figure 7:
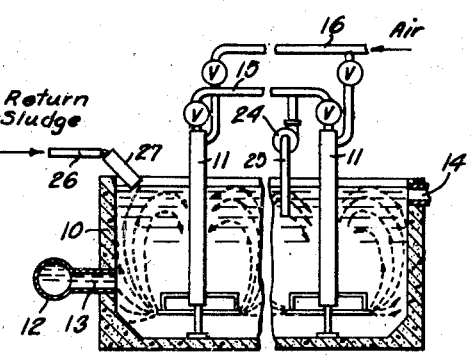

Fig. 7 is a flow diagram showing a modification of the arrangement of Fig. 3.

The action of a submerged water-jet injector aspirating air is to entrain the air with the water stream, and such entrained air is dispersed in minute bubbles within the body of a liquid into which the injector discharges. These fine bubbles are disseminated through a considerable area of the liquid by the force of the jet stream. Due to their extreme degree of sub-division they are highly effective for oxidizing the oxidizable substances that are dissolved or suspended in a body of water or sewage into which the bubbles are injected. For purpose of comparison, samples were taken of air escaping at the surface of sewage in an aeration tank, which had been introduced into the liquid by different means at approximately 5.5 pounds per square inch pressure, and the samples were analyzed for oxygen. The results are shown in the following table showing in the columns from left to right (1) the manner of introducing the air, (2) the oxygen content of the collected sample, and (3) the percentage of oxygen of normal air consumed in oxidizing the constituents of the sewage.

| Mode of Introduction | Per Cent $O_2$ | Per Cent $O_2$ Consumed |
| --- | --- | --- |
| Normal Air | 20.9 | |
| Porous plate, 30 permeability | 20.2 | 3.3 |
| Compressed air jet | 20.1 | 3.8 |
| Water-jet injector | 16.2 | 22.5 |

The greatly increased oxidizing power of the finely dispersed air bubbles from the jet injector is readily apparent.

For the present purpose a jet injector-aerator is most advantageously operated in such manner that it does no work in pumping air. Thus, air is fed to the injector at a pressure equal to the head against which the air is discharged by the jet, so that the air feed pressure is determined by the depth of submersion of the injector in the aeration tank. If the air is fed at a lower pressure, such that work must be performed by the injector in pumping air, the water pressure of the jet, for the same output, must be increased to a greater degree than that which is proportionate to the reduction of the air pressure, and the mechanical efficiency of the operation is lowered. On the other hand, if the air feed pressure is greater than the head, not only is mechanical efficiency likewise lowered, but also the size of the discharged air bubbles is increased. Hence a jet injector-aerator is preferably to be operated at an air feed pressure approximately equal to the head of water in the tank. Since the specific gravity of ordinary sewage is only very slightly greater than that of water, the air feed pressure to the injector under the preferred condition is approximately 0.433 pound per square inch per foot of submersion of the injector in the aerating tank; e. g. for 10 feet submersion the air feed pressure to the injector is 4.33 pounds per square inch.

The fineness of the air bubbles discharged by the jet varies somewhat with the velocity of the water jet, hence with the water pressure to the injector. At high pressures the bubbles are smaller than at low pressures. When the air is injected into a body of sewage, small bubbles escaping at the surface of the sewage have a lower oxygen content than larger bubbles, hence the oxygen content is a measure of the fineness of the bubbles. In a series of tests under approximately the same conditions except for varying the water pressure the following results were obtained with a 4-A 1-inch Penberthy injector in a sewage aeration tank. The figures show the variation in oxygen content of the air bubbles at the liquor surface with the variations of water feed pressure.

| Water Pressure | Per Cent $O_2$ |
| --- | --- |
| 10 lbs./sq. in | 17.8 |
| 20 lbs./sq. in | 16.3 |
| 30 lbs./sq. in | 16.2 |
| 40 lbs./sq. in | 16.5 |
| 80 lbs./sq. in | 13.4 |

At pressures of from 20 to 40 pounds per square inch gauge the variations in $O_2$ content are considered to be within the limit of error and of variations in other conditions, so that no substantial change in $O_2$ utilization is indicated. The oxygen content, however, is significantly higher in the sample taken at the low water pressure of 10 pounds per square inch, and significantly lower at the high pressure of 80 pounds per square inch. For practical reasons a water pressure of 20 to 30 pounds per square inch is considered satisfactory for commercial operation, since the advantage of increased oxidizing efficiency with operation at 80 pounds per square inch water pressure, or thereabout, would ordinarily be more or less offset by the higher power cost for pumping.

For operating a jet injector-aerator according to the invention it is not necessary to dilute the sewage with the injection water. The sewage itself provides a ready source of water supply for the injector, which may be obtained by pumping out of the aeration tank in which the purification treatment is carried out. Another source is the return sludge. The activated sludge process requires a constant flow of return sludge which under normal conditions is suitable in character and adequate in amount for use as the injector water stream. Return sludge contains only about 2 per cent of suspended solids, which are of a soft and bulky quality, free from sand and grit. It can be pumped with usual pumping equipment and flows through pipes without causing obstructions. It normally contains no particles which will not freely pass the orifices of the injector or which will cause erosion thereof. Therefore, it is advantageous to combine the pumpage of the return sludge with the water feed for the injector. Such mode of operation simultaneously mixes the return sludge with the sewage and aerates the mass, while the air flow through the aerator, assuming a proper balance of aerating capacity and tank volume, provides sufficient agitation to secure a thorough turnover of the liquid in the tank without the aid of any mechanical agitator.

One form of apparatus for aerating sewage and the like according to the invention is illustrated in Fig. 1 of the drawing, which shows an assembled unit consisting of two oppositely directed injectors with air and water pipe connections and supporting base. The apparatus is supported by a vertical tube 1 having a blind flange 2 at the lower end to form the base and a valved water pipe connection 3 at the upper end. Enclosing tube 1 is a jacket 4, conveniently formed of a concentrically disposed pipe of larger diameter, which extends from a point below the water inlet to a point somewhat above the base and is welded or otherwise secured to tube 1 at the top and bottom with fluid-tight joints, allowing the ends of the inner tube to protrude beyond the jacket. Jacket 4 provides an annular passage surrounding tube 1 through which air is introduced by valved air pipe connection 5 at the top. Near the lower end of tube 1 below jacket 4 lateral pipes 6 are connected, and similar lateral pipes 7 project from the lower part of jacket 4, thereby forming pairs of side-arms communicating respectively with the tube and the jacket. A water-jet injector 8 is operatively connected to each pair of lateral pipes, as shown. The assembly may be made up of standard pipe and fittings. It is to be set in the aeration tank with its base resting upon the bottom of the tank, and is held in upright position by means of the air and water pipe connections at the top. Although the apparatus is shown with two injectors for purpose of illustration, a similar arrangement having one or a plurality of injectors may obviously be made. An assembled unit having four injectors equally spaced radially about the central tube is shown in plan in Fig. 2, in which the same numbers identify the corresponding parts shown in Fig. 1. Any other desired number of injectors may be similarly arranged with pipe connections radiating from the central tube and jacket as headers.

Fig. 3 shows diagrammatically a sewage plant layout in which the aforesaid method and apparatus are employed, utilizing the return sludge as water feed to the injectors. The aeration tank 10 may be an elongated structure in which one or more injector-aerators 11 of the previously described type are installed in suitably spaced relation. The sewage flows from a main 12 through inlet 13 at one end of the tank 10, and overflows at the other end thereof through outlet 14. Aerators 11 are connected to water (or return sludge) pipe 15 and air feed pipe 16, respectively. During passage through tank 10 the sewage is aerated by air delivered through the injectors in the manner already described. The minute air bubbles issuing from the injectors under the force of the jet create a diffused upward current within the liquid in a direction away from the vertical center line of the aerator, which merges at or just below the surface of the liquid into a counterbalancing downflow toward the center, as indicated by the flow lines. The circulation creates sufficient turnover of the liquid to insure thorough intermixing of the sewage and return sludge and to cause diffusion of the air bubbles throughout the mass for oxidizing the impurities therein.

The purified sewage overflowing at outlet 14 is conducted through pipe 17 to a settling tank 18, which may be of any of the types commonly used in sewage purification processes. The drawing shows a tank provided with a drag-chain conveyor 19, which moves the settled sludge to a sump 20, whence it is removed through an outlet pipe 21 by a pump 22 and returned to the water or sludge feed pipe 15, as indicated by the broken line, for operation of the aerators 11. The supernatant liquor overflows from the tank into a discharge trough 23.

Alternatively, the water feed to the injectors may be pumped directly out of the aerating tank, while the return sludge is mixed in usual manner with the sewage influent to the aerating tank, as shown in Fig. 7, wherein the numbered reference characters, where identical with those of Fig. 3, denote the same parts. Aeration tank 10, which is equipped with injector-aerators 11, is supplied with sewage from main 12 through inlet 13, while the treated sewage overflows through outlet 14. The injectors 11 are supplied with water and air by means of pipes 15 and 16, respectively. The water supply for pipe 15 is obtained from the sewage in tank 10 by means of pump 24 having a suction pipe 25, the inlet to which is located below the liquid level in tank 10. Return sludge is fed in usual manner to the tank through pipe 26 and feed trough 27.

Modified arrangements of aerating apparatus adapted for installation in treating tanks of large capacity are shown in Figs. 4–6. Fig. 4 is a plan view, and Fig. 5 a sectional elevation of an arrangement having a plurality of aerating units in series. Water or return sludge is supplied at one end of a tank 20 through valved inlet pipe 21, downcomer pipe 22 and horizontal header 23 resting on supports 24 placed at intervals lengthwise of the tank. Similarly, air is supplied by inlet pipe 25, downcomer 26 and header 27, the latter being parallel to header 23 and also resting on supports 24. Headers 23 and 27 are preferably located near, but somewhat above, the bottom of the tank. Water header 23 is connected at suitably spaced intervals to transverse water feed pipes 28, which are connected at either end to injectors 29. Air header 27 is connected to transverse air feed pipes 30, which are connected to injectors 29.

Fig. 6 is a sectional elevation showing an alternative piping arrangement, in which water header 23 is disposed below air header 27, resting on supports 24 and 24', respectively. Lateral connections to injectors 29 are, as shown, similar to those in Fig. 5.

In order to demonstrate the advantages of the present invention, a comparative test was made with a standard commercial type of mechanical aerator of the induced down-draft type having a central draft tube and propeller. Two identical aerating tanks of 200,000 gallons capacity were used, standing side by side and simultaneously fed from a common header with a mixture of sewage and return sludge. In one tank were installed two of the mechanical aerators so spaced as to treat the tank contents effectively, each aerator having an impeller directly driven by an electric motor. In the other tank 4-jet injection aerators, of the type shown in Figs. 1–3, were set with similar spacing. The latter were made with a 3 inch central water pipe and a 6 inch pipe jacket for air, with 1 inch lateral water pipe connections to the 1 inch Penberthy injectors and 1¼ inch air pipe connections thereto. The injectors were submerged in the tank at a depth of 13 feet. The sewage was of an industrial type which had previously been passed through screens and a grit settling basin. The sewage at a flow rate of 558 gallons per minute per tank was mixed with 222 gallons per minute of return sludge, so that the total flow rate through each tank was 780 gallons per minute. The detention time was 4.27 hours. The water supply for the injection aerators was obtained by pumping out of the sewage treating tank.

The injection aerators were operated at a water pressure of 30 pounds per square inch and an air feed pressure of 5.75 pounds per square inch gauge. The total flow of water (8 jets) was 91 gallons per minute, and the total air flow was 90 cubic feet per minute. Air flow per gallon of sewage influent was 0.161 cubic foot. Power consumption of the water pump and air compressor was approximately 7 H. P. The power consumption of the mechanical aerators was approximately 10 H. P. The air flow of the mechanical aerators, being drawn by entrainment from the atmosphere, could not be measured.

The test was conducted for 24 hours. Samples were taken of the sewage influent and of the settled effluent from each treating tank, and analyzed for 5-day B. O. D. and for phenol (Gibbs method), with the following results expressed in parts per million:

|  | B. O. D. | Phenol |
|---|---|---|
| Sewage influent | 128 | 38 |
| Effluent from mechanical aerators | 42 | 8 |
| Effluent from injection aerators | 36 | 7 |

The pounds B. O. D. removed per minute was 0.40 for the mechanical aerators and 0.428 for the injection aerators. On a power consumption basis the corresponding values of B. O. D. removed per horse power hour were 2.4 pounds for the mechanical aerators and 3.68 pounds for the injection aerators.

The performance of any sewage purification system, when operated so as to give the desired degree of purification, resolves ultimately into terms of cost on the basis of investment in plant and of its cost of operation. An injection aerator of the type herein described has the advantage of low first cost and low maintenance cost as compared with other types of aerators. It is simple in design and can be constructed of standard parts at low cost. Having no moving parts, there is practically no wear and little maintenance. Its power requirements are supplied by standard pumps and compressors installed on a plant basis rather than an individual unit basis. On a power consumption basis it operates at a fraction of the cost of the diffused-air process, and as compared with tried mechanical aeration processes, it can operate also with lower power consumption.

I claim:

1. In the treatment of sewage by the activated sludge process, wherein the sewage is mixed with activated sludge and aerated, the improvement which consists in supplying a water stream under pressure to water-jet injectors submerged in a liquid body of the mixture of sewage and activated sludge adjacent the bottom of said body, supplying air to said injectors, aspirating such air by means of said water stream in said injectors, and immediately discharging from the injectors the resulting water stream carrying entrained air into the liquid body of sewage and activated sludge, whereby the air is released in extremely fine bubbles to aerate and agitate the said liquid body.

2. In the treatment of sewage by the activated sludge process, wherein the sewage is mixed with activated sludge and aerated, the improvement which consists in supplying a water stream under pressure to water-jet injectors submerged in a liquid body of the mixture of sewage and activated sludge adjacent the bottom of said body, supplying air to said injectors at a pressure approximately equal to the hydrostatic head of the liquid above the injectors, aspirating such air by means of said water stream in said injectors, and immediately discharging from the injectors the resulting water stream carrying entrained air into the liquid body of sewage and activated sludge, whereby the air is released in extremely fine bubbles to aerate and agitate the said liquid body.

3. Method according to claim 2, in which the water stream is supplied to the submerged injectors at a pressure of about 20 to 30 pounds per square inch.

4. Method according to claim 2, in which the water supply for the water-jet injectors consists of the sewage being treated.

5. Method according to claim 2, in which the water supply for the water-jet injectors consists of the activated sludge formed by settling the solids from the aerated sewage.

6. In the treatment of sewage by the activated sludge process, the method which comprises introducing a continuous flow of the liquid sewage into an aerating zone, supplying a stream of a watery suspension of activated sludge to water-jet injectors submerged in the liquid near the bottom of the body thereof, supplying air to said injectors, aspirating such air by means of said watery stream in said injectors, immediately discharging from the injectors the resulting water stream carrying entrained air into the liquid body of sewage to mix the activated sludge with the sewage and to aerate and agitate the mixture by means of air thereby released in extremely fine bubbles, overflowing the aerated mixture from said zone, settling the suspended sludge particles therefrom and returning the settled sludge to said injectors.

7. Method according to claim 6, in which air is supplied to said injectors at a pressure approximately equal to the hydrostatic head of the liquid above the injectors.

THOMAS J. POWERS.

REFERENCES CITED

The following references are of record in the file of this patent:

UNITED STATES PATENTS

| Number | Name | Date |
|---|---|---|
| 762,466 | Church et al. | June 14, 1904 |
| 950,999 | Erlwein et al. | Mar. 1, 1910 |
| 1,026,704 | Sargent | May 21, 1912 |
| 1,189,114 | Irwin | June 27, 1916 |
| 1,286,775 | Rein et al. | Dec. 3, 1918 |
| 1,394,698 | Trent | Oct. 25, 1921 |
| 1,427,210 | Hook | Aug. 29, 1922 |
| 1,734,011 | Harrison | Oct. 29, 1929 |
| 1,806,394 | Giesler et al. | May 19, 1931 |
| 1,808,956 | Ketterer | June 9, 1931 |
| 2,024,345 | Elrod | Dec. 17, 1935 |
| 2,048,640 | Sperry | July 21, 1936 |
| 2,126,164 | Anderson | Aug. 9, 1938 |
| 2,381,579 | Durdin, 3d | Aug. 7, 1945 |
| 2,404,223 | Durdin, 3d | July 16, 1946 |

FOREIGN PATENTS

| Number | Country | Date |
|---|---|---|
| 27,948 | Great Britain | 1904 |
| 14,733 | Great Britain | 1915 |
| 174,560 | Switzerland | Apr. 1, 1935 |